Dec. 8, 1936.   S. RUBEN   2,063,524
ELECTRICAL AMPLIFIER CIRCUIT
Filed July 22, 1933

INVENTOR
Samuel Ruben
BY
ATTORNEY

Patented Dec. 8, 1936

2,063,524

UNITED STATES PATENT OFFICE 2,063,524

ELECTRICAL AMPLIFIER CIRCUIT

Samuel Ruben, New Rochelle, N. Y.

Application July 22, 1933, Serial No. 681,715

4 Claims. (Cl. 179—171)

This invention relates to electrical amplifier circuits and more specifically to a circuit including grid controlled vacuum tubes in which a bias is applied to the grid.

One of the objects of the invention is to provide a vacuum tube amplifying circuit in which line voltage is used as the source of plate and cathode potentials and a self potential generating device, substantially incapable of supplying current, is used to supply the grid bias.

A further object of the invention is to provide a vacuum tube audio amplifier which is quiet in operation and which can be efficiently built, with the elimination of certain parts heretofore used in circuits of this type.

Another object is the provision of a vacuum tube amplifier circuit which has a permanent self contained and self potential generating biasing device for the grid elements of the vacuum tubes.

Still another object of the invention is the provision of a vacuum tube amplifier, especially suitable for use in automobile radio receivers employing so-called "B battery eliminators" or other vibrator or motor devices designed to produce a rectified and filtered pulsating high voltage from the storage battery of the automobile.

Figure 1:
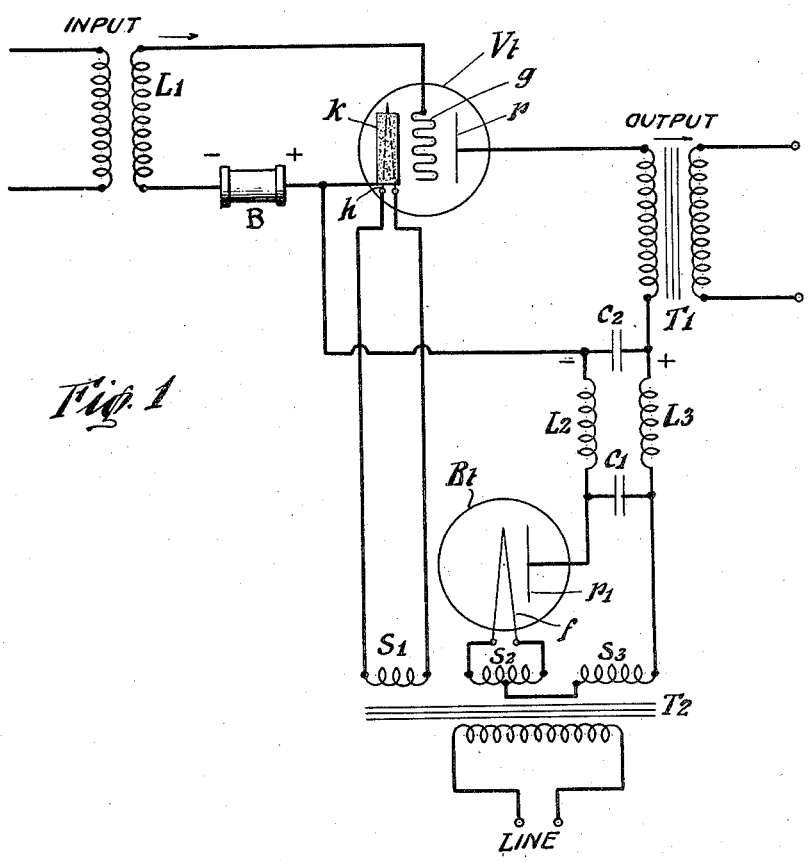
Figure 2:
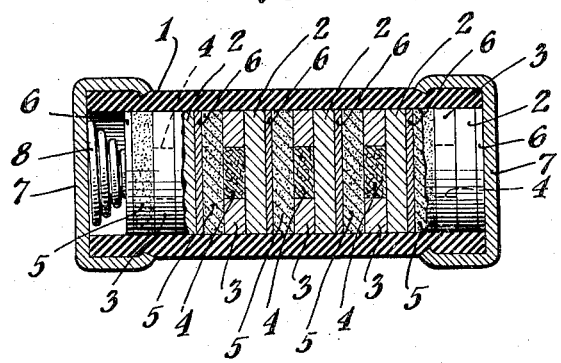

Other objects will be apparent from the disclosure and from the drawing in which Fig. 1 shows a typical amplifier circuit and Fig. 2 shows the biasing device, partially cut away, so as to illustrate the position of the various elements.

In the battery operated sets of the prior amplifier and radio art where a storage battery was used to supply the filament current and the conventional "B" batteries were used to supply the plate voltage, a small dry cell type of battery, called the "C" battery was used to supply the negative grid bias. As is well known, these "B" and "C" batteries had an inherent disadvantage; that is, their output was continuously reducing whether the radio sets were operated or not. This was due to the chemical solubility of the cathode or negative plate materials used in the battery, for instance, the dissolution of the zinc into the chloride electrolyte.

With the introduction of the "B" eliminator, the alternating current from the line was used to supply "B" and "C" voltages for the respective plates and grids.

With the introduction of the alternating current operated radio sets the plate and biasing voltages were supplied from the line as was also the filament current.

In the operation of automobile radio sets where so-called eliminators are used, the plate and grid voltages are obtained from a vibrator or motor device actuated by the storage battery.

In the electrically operated radio sets the major part of the distortion resulting from the use of the line voltage is due to the fact that the small amount of voltage required to bias the vacuum tube grids is obtained from this source; whenever there is a variation in the line voltage the variation is reflected in the sensitive grid circuits.

One of the drawbacks in the operation of automobile radio sets having an associated "B" battery eliminator is the excessive amount of noise or so-called "hash" introduced into the grid circuit from the vibrator or motor. This is due to the fact that the grid biasing voltage is taken from the eliminator.

Another disadvantage both in alternating or direct current receivers or in automobile receivers where the grid bias voltage is supplied either from the line or from the eliminator, is that the available supply of voltage for the plate circuits is reduced by the subtraction of this necessary voltage for the grids. There is also the requirement of voltage dividers which tend to raise the temperature and there is the further requirement of additional filter components.

By the use of my invention these disadvantages and limitations are removed and a quiet, lower cost and more efficient set is produced, with the elimination, in some instances, of bias resistors, shunt capacitances, etc.

This application is in part a continuation of my applications bearing Serial Numbers 633,607, filed 17 September, 1932, and 667,491, filed 22 April, 1933, now Patent #1,920,151, issued 25 July, 1933, in which are described a biasing device utilizing the contact potential difference between electrodes of an electro-positive material such as aluminum or zinc and an electronically conductive relatively electro-negative material such as a conductive oxide and having a non-reacting electrolyte in which the electrodes were substantially insoluble such as a viscous non-evaporating slightly acidic alcohol compound.

In the cell described in those applications I employ as the cathode or negative plate, a material preferably highly electro-positive, for instance, aluminum, magnesium, beryllium, cadmium, zinc or an alloy or amalgam of one or more of those metals. As the anode or positive plate I employ a material such as cuprous oxide, iron oxide, lead peroxide, vanadium oxide, cadmium oxide, carbon or a conductive compound of carbon. The contact potential of the cell is dependent upon the electro-chemical dissimilarity between the cathode and anode.

As electrolytes, I prefer to use compounds of the viscous substantially non-evaporating alcohol compounds, such as the glycols, glycerols or glyceroids, either alone or in combination with the weak acids, such as boric, malic, oxalic, lactic, tartaric, oleic, formic or the salt compounds of these acids. The percentage of acid is desirably very low as it is essential for long cell life, that the electrolyte be substantially free of corrosive or reactive agents. In most cases, it is desirable that the electrolyte should not too readily harden or crystallize, a semi-fluid viscous condition being maintained, if possible. Typical examples of suitable electrolytes are as follows:

(1) A heated mixture of glycerine and ammonium formate, possibly resulting in the formation of glycerol formate;

(2) Eleven parts of triethanolamine, five parts of oleic acid and two parts of the ethyl ether of ethylene glycol, heated to a proper viscosity;

(3) Glycol and glycerol borates.

Where an inorganic type of electrolyte is desirable, one of the viscous potassium or sodium silicates may be used. In such case, it is essential that the cathode materials be substantially unreactive with these solutions.

In my biasing device no observable chemical reaction takes place between the electrolyte and the electrodes; if one does take place, it is of such negligible character as to be not harmful and of no substantial effect toward shortening the life of the cell which life appears to be practically limitless. In the battery art the function of the cathode or negative plate has always been that of generating a potential and current supply by virtue of its electro-chemical decomposition and combining with the electrolyte. Thus zinc dissolves into ammonium chloride or sulphuric acid to form zinc chloride or zinc sulphate, the current generated governing the cathode consumption. For this reason, a chemically reactive salt is necessary to generate a current of any practical magnitude.

The function of my biasing cell is only to produce a potential and it can serve only such a use. This is due to the substantially chemically non-reactive character of the electrolyte, its limited ionization and high specific resistance. In the cell of my invention the internal resistance of the cell is sufficiently high to prevent any appreciable current flow. This precludes the use of the cell as a current supply, that is, as a primary battery cell. This difference may be further emphasized by a comparison of the relative resistance values of the electrolyte. The electrolyte of my invention has a resistance usually thousands of times that of the electrolyte of the usual primary cell. This is apparent when the resistances of electrolytes used in the various voltaic cells such as the Edison-Lalande, Daniell, gravity, silver chloride, dry cell, Leclanche, Grove, Bunseh, bichromate, storage, Clark or Weston are compared with the electrolyte of my cell.

A comparison of the operation of my cells in a circuit as contrasted with the operation of a circuit utilizing the usual "C" battery cell, may be made by attempting to draw current from the cells when used in a circuit. With the usual "C" battery, a considerable amount of current, for instance several milliamperes, may be drawn from the batteries without drop of potential or without drop of voltage output except as such a drop may occur through internal electro-chemical action in the cell, and such a cell will continue to deliver voltage over a long period of time even while the cell is being called upon to deliver current or is having a current discharged therethrough. If an attempt is made to draw current from the bias cell of my invention and its associated circuit, the voltage immediately drops to a negligible value even though only a current of one or two micro amperes may be desired. The same result obtains if current is discharged through my cell in its circuit. Such discharge of current through the cell, however, has no effect toward shortening the life of the cell, nor does it affect its voltage output, once the source of current is withdrawn.

In order to provide a more detailed description of one embodiment of my invention, reference is made to the drawing and to Fig. 1 thereof in which the vacuum tube $V_t$ shown with heater element $h$ and plate or anode $p$, has its grid $g$, negatively biased with respect to its cathode $k$ by means of bias device B, which is connected through input inductance $L_1$. The plate voltage for tube $V_t$ is obtained through the secondary $S_3$ of transformer $T_2$ from rectifier tube $R_t$ in which are filament $f$ and plate $P_1$. The low voltage and current for heating the heater element $h$ are obtained through secondary $S_1$ of transformer $T_2$. The filter current to reduce the ripple is composed of condenser $C_1$ and $C_2$ and impedances $L_2$ and $L_3$. The plate circuit output is discharged through transformer $T_1$.

In Fig. 2, the tube 1, constructed of fibre or other suitable material, houses a series of voltaic cells, each composed of zinc cathode disc 2, vanadium pentoxide anodes (5) and glycol borate impregnated cotton plugs (4) which afford the necessary electrical contact between the cathode 2 and anode 5. The plugs 4 are disposed within sealing washers (3) which are of rubber, paraffined papers or other material adapted to prevent leakage of the glycol or absorption of moisture from the atmosphere. Lead washers (6) space and contact the couples which are maintained under constant pressure by spring 8 and metal caps 7 which close and seal the device.

The voltage output of the device is dependent upon the number of couples in series. For variable voltages, the device may be tapped at different points.

The areas of the junctions are such that when in a alternating current circuit, as in the biasing of an audio amplifier, the inter-element capacity of the couple is adequate to introduce a reactance in the grid circuit.

In operation, the vacuum tube $V_t$ has its grid element biased negatively in respect to its cathode by means of bias device B. This reduces the electron current flow between the cathode and anode and any potential from input inductance $L_1$ varies the grid bias potential, thus causing a corresponding plate current change in the output device, that is, transformer $T_1$, which may be connected in a manner well known in the art to an audio reproducing device such as a telephone or speaker, (not shown).

Since certain changes in the arrangement of the circuit and its components, and obvious substitutions can be made in the arrangement of the circuit elements without departure from the scope of the invention, it is intended that all matters contained in the above description or shown in the accompanying drawing shall be interpreted as illustrative and not in a limiting sense.

Having described my invention, what I claim as new and desire to secure by Letters Patent, is:

1. In a vacuum tube amplifying circuit, a vacuum tube comprising a cathode, an anode and a control grid, a biasing means connected to said grid for negatively charging said grid in respect to its cathode, said biasing means comprising a cathode, an anode and an electrolyte in which said cathode and anode are substantially insoluble, so that said biasing means is insufficiently chemically active to maintain the potential of said biasing means if current is discharged through the grid circuit.

2. In combination, a vacuum tube amplifier alternating current signal means connected to the input thereof and a direct self potential generating means connected to the control grid of said vacuum tube so as to maintain said grid at a negative potential in respect to its electron emitting cathode, said self potential generating means comprising a cathode, an anode and an electrolyte in which said cathode and anode are substantially insoluble, so that said biasing means is incapable of maintaining its normal voltaic potential when the potential of the alternating current signal reaches a value sufficient to cause a discharge of current therethrough.

3. In combination with a source of alternating current potential, a vacuum tube amplifier containing a vacuum tube having a cathode, an anode and a control grid, a voltaic generating means connected to the control grid of said vacuum tube so as to maintain said grid negative in respect to its electron emitting cathode, said voltaic means comprising a cathode, an anode and an electrolyte in which said cathode and anode are substantially insoluble, so that said biasing means is electro-chemically incapable of maintaining its normal potential when a current is positively discharged through said grid circuit.

4. In an electric oscillation amplifying circuit, an amplifying tube comprising a cathode, an anode and a control grid, a biasing means associated with said grid for producing a fixed bias thereon, said biasing means comprising a potential producing cell connected to said cathode and connected to said grid, said cell producing a potential difference in the absence of current flow but producing no appreciable current flow when in a closed circuit, said cell comprising a negative plate formed of an electropositive material, a positive plate and an electrolyte, said positive plate and negative plate being formed of materials substantially insoluble in and substantially unreactive with said electrolyte whereby said cell is characterized by negligible chemical reaction between said electrolyte and said negative plate and positive plate and substantially no deterioration is produced in said cell when in open circuit or not in use.

SAMUEL RUBEN.